March 6, 1951 W. A. AYRES 2,543,753
COLOR ALTIMETRY
Filed June 30, 1943 3 Sheets-Sheet 1
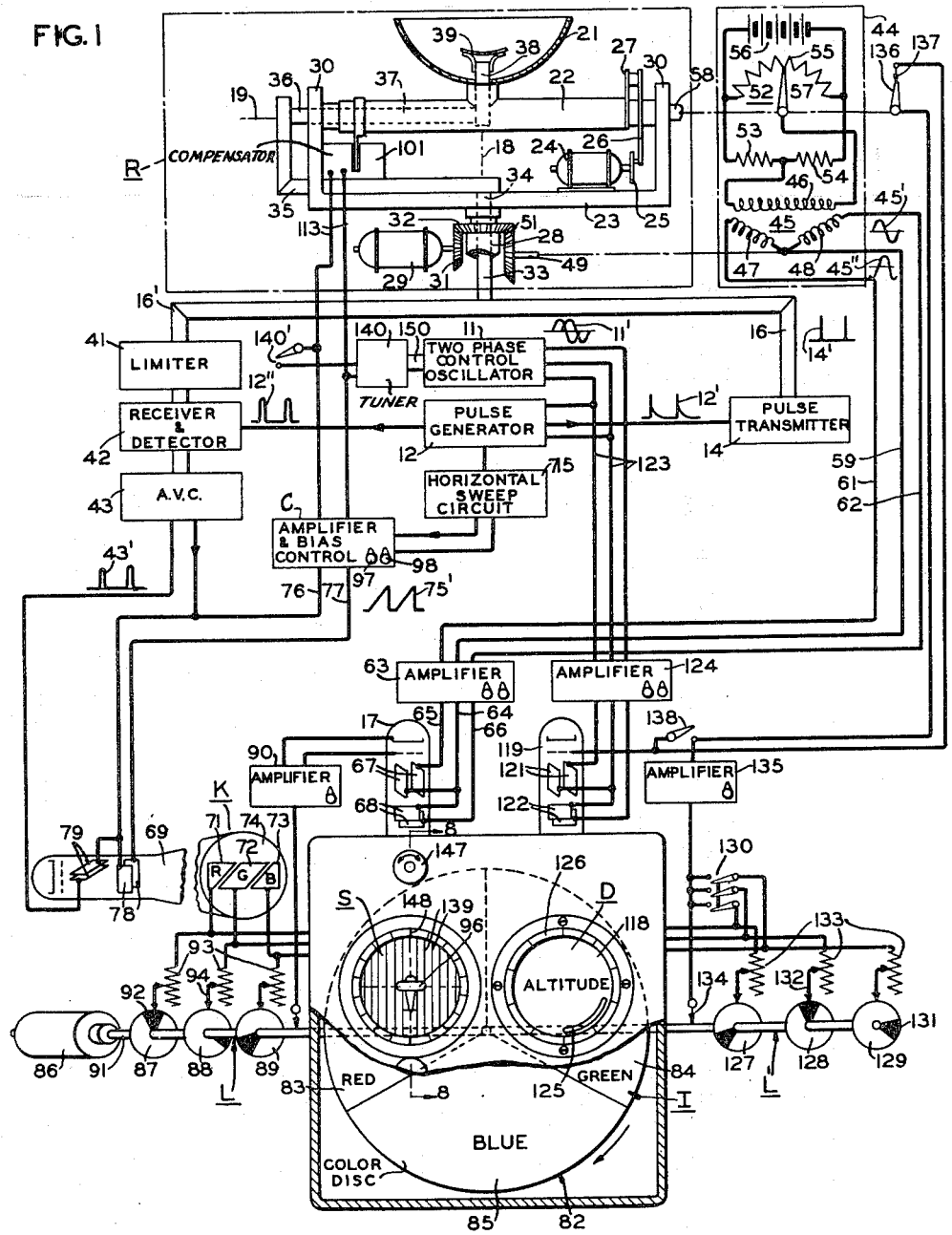
INVENTOR
W. A. AYRES
BY
Herbert N. Thompson
his ATTORNEY March 6, 1951 W. A. AYRES 2,543,753
COLOR ALTIMETRY
Filed June 30, 1943 3 Sheets-Sheet 2
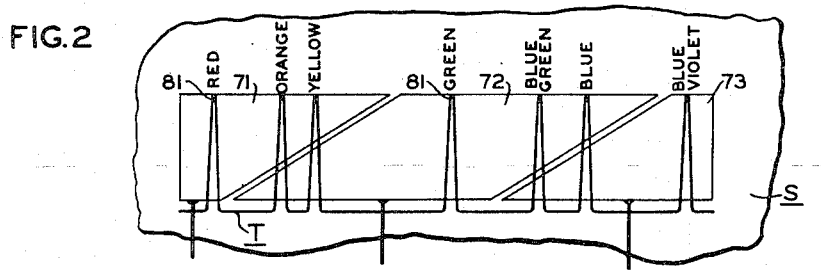
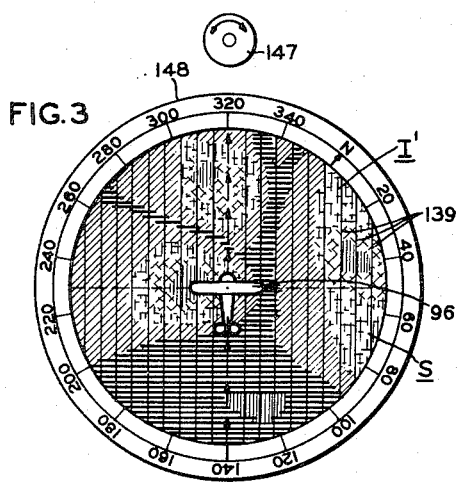
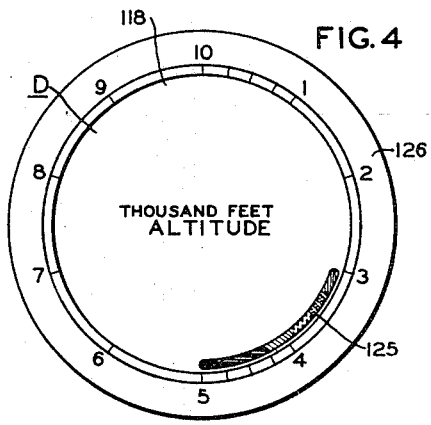
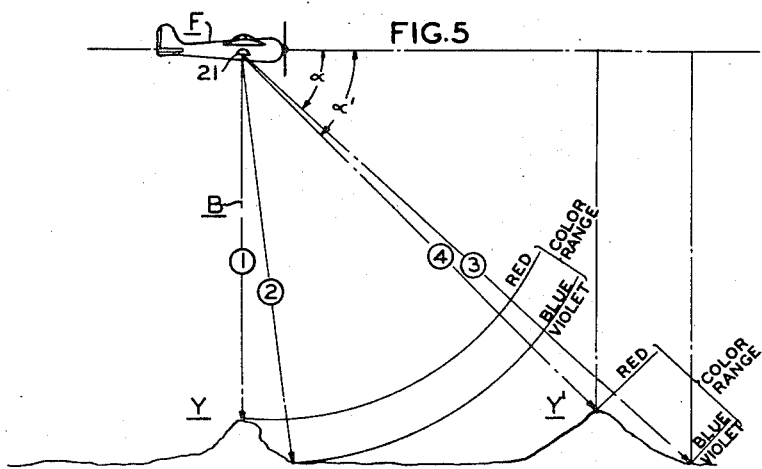
INVENTOR
W. A. AYRES
BY
Herbert H. Thompson
his ATTORNEY.

March 6, 1951 W. A. AYRES 2,543,753
COLOR ALTIMETRY

Filed June 30, 1943 3 Sheets-Sheet 3

INVENTOR
W. A. AYRES
BY
Herbert H. Thompson
his ATTORNEY.

Patented Mar. 6, 1951

2,543,753

UNITED STATES PATENT OFFICE 2,543,753

COLOR ALTIMETRY

Waldemar A. Ayres, Kew Gardens Hills, N. Y., assignor to The Sperry Corporation, a corporation of Delaware Application June 30, 1943, Serial No. 492,802

29 Claims. (Cl. 343—11)

This invention relates to the art of object scanning, and more particularly to methods of and apparatus for surveying objects and forming colored or other peculiarly characterized representations of the component portions of the objects to represent some function of the portions, preferably independent of their natural color. Thus, the portions may be characterized as a function of distance from a reference point, for example, the observer or surveying mechanism. This application is a continuation-in-part of application Serial No. 468,298, filed December 7, 1942, now Patent No. 2,508,358, issued May 23, 1950.

The invention has specific application in the fields of object detection and range finding, especially as applied to map plotting and altimetry, to which uses typical embodiments of the invention herein have been shown applied. It is customary for an aircraft, when traveling in darkness or fog, to project a beam of radiant energy, such as collimated ultra high frequency electromagnetic waves, preferably having a wavelength in the range from 1 cm. to 100 cm., against successive portions of an object to be scanned. Images of the irradiated portions then may be formed oscillographically by synchronizing the movements of the radiant energy beam and the oscillograph ray or stream, thereby to form an oscillograph image depicting the general shape and location of all irradiated objects capable of reflecting radiation to the region of the source in color, shade or other characteristic of appearance. It frequently is desirable for the observer to know the range or other distance function of the various reflecting portions of an irradiated terrain without the need for additional cumbersome equipment, and without requiring the observer to divert his attention from the screen on which the image is produced. Not only is this so, when the objects to be visualized are obscured by darkness or adverse weather conditions, but also when the objects though clearly visible are composed of portions whose distances from the observer are indistinguishable because of similarities in color, shade, or other characteristic of appearance.

The present method and apparatus satisfy this need by determining the time interval between the transmitted and received energy pulses and characterizing the appearance of the resulting image as a function of the determined interval. The respective images of the irradiated portions correspondingly are characterized as by coloring, toning, controlling the brightness, or otherwise modulating the appearance of the image, irrespective of the natural appearance of the irradiated objects.

The principal objects of the present invention are: to provide an improved object-detecting system; to provide a system for forming pictorial reproductions of remote objects and for modifying the appearance of the reproductions in accordance with a function of the range of the objects; to provide a system of representing distant objects by different colors, tones, or textures, signifying the range of the respective objects; to provide an object-irradiating system adapted to project radiant waves recurrently against successive portions of a remote object, and to form representations of such portions in colors characterizing a function of the time required for the waves to travel to and from the object; to provide in such systems means for forming colored representations with a primary system of colors to represent objects lying in zones at different distances from the surveying mechanism, with means for blending such colors to represent objects lying in regions intermediate such zones; to provide a system for measuring a component of the slant range of an irradiated object, and for forming a representation of the object colored as a function of such component; to provide a system for forming a simulated relief map in colors in conjunction with a color-distance scale denoting a function of the distance to the irradiated objects as represented by the correspondingly-colored portions of the map; to provide a single coloring means for characterizing such map and scale; to provide a combined radar image and drift detecting device cooperative therewith; and to provide a control system whereby the effective color range or spectrum may be correlated with the distance to the irradiated terrain, and with the range of distances from the nearest and farthest portions of the terrain being scanned. These and other objects of the present invention will become apparent from the following description and from the accompanying drawings.

In the drawings,

Fig. 1 is a schematic diagram of one system embodying principles of the present invention.

Fig. 2 is an enlarged detailed view of the range commutator tube.

Fig. 3 is an enlarged elevational view of the picture tube screen as it appears in operation, a view of the scanned terrain being formed in simulated relief.

Fig. 4 is an elevational view of the range tube screen during operation, a linear zone in colors being formed corresponding to the determined range of distances.

Fig. 5 is a diagram illustrating the error in altitude readings introduced by scanning away from the perpendicular.

Figure 8:
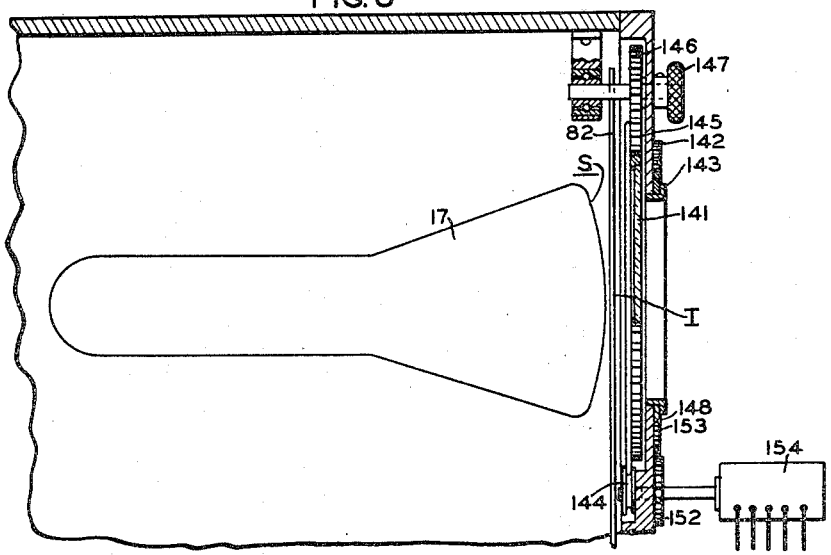

Fig. 8 comprises an enlarged sectional view taken on the line 8—8 of Fig. 1.

Figure 9:
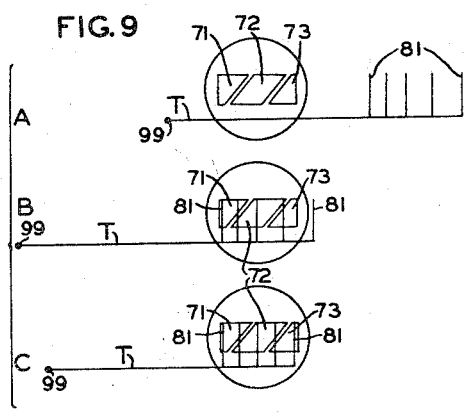

Fig. 9 is a composite diagram illustrating the control of reflected pulses to fit them to the range commutator.

Figure 10:
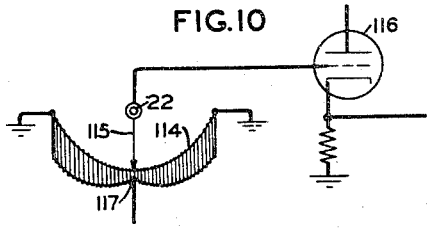

Fig. 10 is a diagram of an alternative arrangement of angle compensator.

Generally speaking, the invention comprehends irradiating a distant object such as the terrain beneath an aircraft and forming a representation or picture of such an object in color or other characterizing media to signify the range or range function of the successive portions thereof. A color scale, coordinated with the picture forming means, indicates in absolute units, the range of the successive portions of the terrain. A typical apparatus for carrying out the invention herein is disclosed as applied to the measurement of altitude, though it operates in a similar manner when measuring horizontal or other distances.

The apparatus comprises generally an energy radiator R, Fig. 1, adapted to project collimated electromagnetic waves against successive portions of an object to be surveyed. The range, preferably measured as the time required for energy to travel to the object and to return to the receiving apparatus, may be determined by a range commutator K. Image characterizing means I, preferably comprising a color disc, are disposed in cooperative relation to a screen S on which the image is formed so as in some way to identify the images as a function of the time differential, or other differential between the transmitted and received energy. A color commutator L renders the image-forming means inoperable except when the reflected energy signifies a range properly characterized by the concurrently cooperative portion of the color disc. A color controller C adjusts the color range to the range of distances to be identified, and a distance meter D includes a color scale for delineating the proper color and distance relationships.

Referring now in greater detail to Fig. 1, the present invention is disclosed in connection with a reflected wave or reflected pulse type of ultra high frequency radio system specifically adapted to produce a chromatic indication of range. In the system illustrated, a two-phase signal generator or control oscillator 11 of any well known type provides a two-phase output having a frequency preferably in the high audio range, suitable for frequency control purposes. The output waves from the oscillator 11, displaced in phase quadrature, are shown diagrammatically at 11', one phase of which may be used directly to sinusoidally modulate the carrier wave of a transmitter 14. Preferably, however, one phase signal from the oscillator 11 is connected to a pulse generator 12 which converts the substantially sinusoidal oscillations fed to it into pulses of any desired shape, magnitude, and duration, having a repetition rate equal to the frequency of the oscillator 11. Both phases of the oscillator 11 are used as the source of a circular sweep voltage for the distance meter D, as will appear. The pulse generator 12 may employ well known clipping and other suitable wave-shaping circuits in the conventional manner, to form square or trigger pulses 12'. The trigger pulses 12' are supplied to the transmitter 14, causing an ultra high frequency oscillator such as a magnetron, to be biased on momentarily. Transmitter 14 thus is caused to produce extremely short pulses 14' having a duration of the order of one microsecond. The carrier frequency waves or pulses are fed through a rectangular wave guide 16 to the radiator R.

The radiator R comprises an energy collimator and scanning means adapted to sweep a beam of radiant energy against successive portions of a remote object. The radiator R also may be useful in picking up the reflected energy and conducting such energy to the image forming means, though it is understood that if the objects are irradiated from a separate source, the radiator R performs only a receiving function. The radiator R may scan through any path but preferably is adapted to scan a predetermined conical angle, ordinarily slightly less than a complete hemisphere, preferably by means of a spiral conical motion. This motion may be provided by rapidly spinning the radiating system about a central axis 18 while slowly nodding the system about a transverse axis 19, preferably perpendicular to and rotatable with the central axis.

Although any type of radiator R may be used to produce electronic or mechanical scanning, a simple form of apparatus comprises a spherical or parabolic reflector 21 attached to a supporting member 22 which is pivotally mounted between the arms 30 of a yoke 23. A motor 24, mounted on the yoke 23 carries a crank 25 on its drive shaft, with a connecting rod 26 extending from the crank to a lever arm 27 extending generally radially from the member 22. The motor 24 preferably rotates at a relatively low speed so as to produce a nod at a corresponding rate about the axis 19 of the reflector 21. A stationary motor 29 rotates the yoke 23 about the central axis 18 by means of a bevel drive pinion 31 and a bevel gear 32 mounted on a hollow column 28, journaled about the central axis 18.

The rectangular wave guide 16 is connected to a cylindrical wave guide 33 which enters the radiator R by passing concentrically through the hollow column 28. A rotatable joint 34 connects the cylindrical guide 33 to another rectangular wave guide 35 fastened to the yoke 23. The guide 35 projects through an arm 30 of the yoke and extends upwardly toward the nod axis 19. A second rotatable joint 36 connects the wave guide 35 to a second cylindrical wave guide 37 supported concentrically within the member 22. A final section of rectangular wave guide 38, attached to the end of the guide 37 lies on the central axis 18 and is adapted to conduct electromagnetic energy to and reflected energy from a deflecting plate 39 within the reflector 21. Suitable low loss rotatable wave joints and means for bilaterally converting electromagnetic wave propogation in rectangular wave guides to propagation in cylindrical guides may be used as desired. So also a suitable impedance-matching system may be used between the wave guide 38 and the deflecting plate 39 to provide maximum transfer of energy.

The transmitted pulses 14' are emitted in a highly directive pattern from the radiator R at a pulsing frequency sufficiently high to insure that all objects within the field of view are irradiated during the scanning cycle, the period between waves being long enough to permit the radiant energy to travel to the most remote point of the scanned object or field, and to return to the region of the transmitter.

The wave guide 16 continues on past the point of intersection with the guide 33 to form a guide 16' providing a return path for the reflected energy to a receiver and detector 42. An amplitude limiter 41 is interposed in the guide 16' so as to protect the receiver from strong pulses conveyed directly from the transmitter 14. The limiter 41 is of well known construction and comprises a device having relatively high impedance to strong signals and relatively low impedance to weak signals.

One well known type of limiter 41 comprises a gas-filled resonant chamber containing electrodes, which chamber is maintained close to the ionization point. The electrodes flash over and discharge the device when strongly excited, thus effectively damping the exciting oscillations. The electrical length of the wave guide 16' is selected to reflect a very high impedance at the point of connection with the wave guide 33 when directly transmitted pulses discharge the limiter.

The receiver and detector 42 amplifies and detects the received pulses in the usual manner and conducts the received signals to an automatic volume control 43, which produces output signals of constant magnitude, substantially independent of input signal strength, especially where the objects are irradiated with continuous-wave energy from a separate source. To further insure against pulses being conducted directly from the transmitter 14 to the receiver, blanking pulses 12" may be furnished from the pulse generator 12 to bias the receiver 42 to an insensitive condition for the duration of the transmitted pulses. The pulses 43' leaving the automatic volume control 43 are delayed behind their respective transmitted pulses by the time required for the radiant energy to travel to the object and to return.

A sweep circuit mechanism 44 mechanically connected to the radiator R is adapted to convert the spiral scanning motion of the radiator into corresponding cathode or light ray deflecting potentials for an oscilloscope 17, suitably a cathode ray tube. The sweep circuit mechanism 44 comprises a two-phase generator 45 having a field winding 46 and rotor windings 47 and 48 spaced electrically 90° with respect to one another. The rotor windings are driven synchronously with the spin motion of the radiator R by means of a rotor shaft 49 having a bevel gear 51 attached thereto identical with and in operative engagement with the bevel gear 32 on the column 28. The field winding 46 is energized by the variable output of a bridge circuit 52 which circuit is formed by series-connected equal fixed resistors 53 and 54 shunted across the terminals of a potentiometer 55. The bridge circuit 52 is supplied with direct voltage from a source such as a battery 56 applied across the bridge, while winding 46 is connected between the junction of the resistors 53, 54, and a sliding contact arm 57 for the potentiometer 55.

The contact arm 57 is oscillated synchronously with the nodding motion of the radiator R by means of a connecting shaft 58 extending from the member 22 along the nod axis 19. The output of the bridge 52 varies from zero, when the principal axis of the reflector 21 is parallel to or coincides with the spin axis 18, to predetermined positive and negative values corresponding to the maximum nod angles in opposite directions. Leads 59, 61 and 62 extend from the two-phase generator 45 to an amplifier 63.

The sinusoidal voltages 45' and 45" produced by the windings 47 and 48, have a frequency equal to the rate of spin, with amplitude varying sinusoidally at the nodding frequency. The voltages 45', 45" are in a phase quadrature, as shown, as a result of the 90° electrical displacement between the windings 47, 48. The amplification of each of the voltages 45', 45" may be controlled as desired by manually-operated knobs on the amplifier 63. The output voltages are fed through wires 64, 65 and 66 to the respective horizontal and vertical deflecting plates 67 and 68 as shown. Accordingly, the amplified voltages 45', 45" in phase quadrature and varying periodically from zero to maximum voltage provide circular sweep for the oscilloscope 17 of constantly changing amplitude, the nod rate being a small fraction of the spin rate. Since the sweep circuit mechanism 44 is synchronized with the radiator R, the cathode ray stream of oscilloscope 17 is swept in a spiral path, the instantaneous orientation being synchronized with the position of the radiant energy beam axis from the parabolic reflector 21.

The device thus far described is in common use for forming on the screen S visual indications or representations of the object being scanned, it being customary to key the tube 17 with the pulses 43', and to form on the screen luminous points designating or delineating the reflecting objects. Such a device by itself fails to provide the operator with any indication of the proximity of the scanned object unless data denoting the proximity of the scanned object is determined and presented separately. In commercial aircraft use, the range of an object lying in the path of flight must be determined to properly enable the pilot to navigate his craft so as to avoid collision with the object. When the apparatus is put to military use, as for tracking targets, the range is necessary in aiming a projectile to be fired at the target. With the present invention, an indication of such parameters as range or target velocity may be provided by differentiating between the transmitted or incident wave, and the received or reflected wave, and chromatically characterizing the visual reproductions formed from the reception of such reflections without adding separate indications.

The range commutator K may be of any desired form capable of segregating the reflected waves according to their travel time, and therefore according to the range of the respective portions of the object from which the waves are reflected. One form of such a commutator K which is useful for this purpose comprises a cathode ray tube 69 having a plurality of spaced electrodes 71, 72, and 73 on the target area or screen 74. A horizontal sweep circuit 75 comprising a conventional sawtooth signal generator is adapted to produce sawtooth waves 75' at a frequency controlled by the pulse generator 12, operative on tube 69 to sweep an electron stream back and forth, while biased alongside of, e. g. below, the electrodes 71, 72 and 73, during each cycle between transmitted pulses, forming a trace T, Fig. 2. This effect is produced by extending the output leads 76 and 77 from the signal generator 75 through the amplifier or color controller C to the plates 78 producing horizontal sweep in the tube 69. Since the electron stream or cathode ray does not impinge upon the electrodes 71, 72, 73 while idling during the sweeping operation, no current flows through the electrodes. However, by providing vertical deflection of the cathode ray at each instant that a signal 43' is received, the cathode ray may be deflected onto one or more of the electrodes to cause a momentary flow of current through the electrodes. This result is obtained by applying the received signals 43' to the plates 79 causing vertical deflection of the electron stream in the tube 69.

In Fig. 2, the electron trace T is shown extending along the electrodes 71, 72, 73, and is shown affected by seven reflected pulses, to illustrate the formation of seven distinct colors by pulses received at successive periods of time following the transmission of an incident wave. At the start of each cycle initiated by the transmission of a pulse the electron stream is deflected to a datum point at the left of the screen, whereupon it progressively sweeps toward the right-hand side during the remainder of the cycle. The reception of any reflected-energy signals during this period causes the trace T to be reflected vertically onto the respective electrodes, forming the peaks 81 in the manner shown. Automatic volume control systems are generally unsuitable as applied to pulse systems, but a constant amplitude effect may be obtained by forming the electrodes of uniform height and amplifying the weakest signals till the peaks reach the tops of the respective electrodes. Since the flow of energy from the electrodes is a function of the area covered by the peaks 81, strong signals, which overshoot the top of the electrodes are effectively clipped, resulting in fairly constant output signal amplitude. Current thus flows through the respective electrodes according to the length of time that the electron stream impinges on the respective electrodes. Since the electrodes 71, 72, 73 are spaced from one another along a path representing the range or travel time of the reflected pulses, it is apparent that the flow of current to the respective electrodes may be used for controlling an image characterizing means, cooperable with the oscilloscope 17 to characterize the images, for example, as a function of range.

The signals from the electrodes 71, 72, 73 may be used directly for modulating the tube 17 in any suitable manner capable of distinguishing the reflections indicative of the scanned object according to the ranges which they designate. Each signal from the electrodes might be used to control the signal intensity, that is, by progressively attenuating signals according to their range, and applying the signals directly to the control grid of the tube 17, whereby brighter representations are formed for shorter ranges, or by any other manner in which representations form by radiant energy having a short travelling time possess a different appearance from those having a longer travel time.

Preferably, however, the representation characterizing means makes use of separate colors, tones, or the like in any way capable of separately coloring the portions of the representation as a function of range. One practical embodiment as disclosed in Fig. 1 utilizes color or toning media of one or more colors, or monochromatic tones intermittently cooperable with the respective respresentations for modifying the chromatic appearance of the representations as a function of the time required for the radiant energy to travel to and from the scanned objects. Because of physical limitations, it has been found advisable to dispose each coloring medium in cooperative relation with the representations for a plurality of successive cycles and to control the signals from the range commutator K so that the representation-forming means are rendered inoperative to form any representations except those which are properly characterized by the concurrently cooperative colored medium.

As shown in Fig. 1 the color medium may comprise separately colored transparent filters intermittently movable into cooperative relation with the screen S. The coloring means may comprise a color disc 82 divided into equal sectors, preferably occupied by thin transparent filters 83, 84 and 85, adapted to pass the primary colors red, green and blue, respectively, although other colors may be used as well. The colors ascribed to the respective ranges may be chosen arbitrarily but in the embodiment herein disclosed, the representations representing close objects logically have been characterized as red because of the more natural response of the observer to this color, rendering it a logical color to use for denoting close objects. Likewise intermediate and distant objects may be characterized by green and blue, respectively, because they are appropriate to this purpose.

With the color disc in the position shown in Fig. 1, the red filter 83 is disposed in front of the screen S so that all representations formed on the screen S appear red. It is obvious that since the red filter occupies this position for a relatively large number of cycles, only those representations designating objects at close range meanwhile should be formed. Control means, such as the color commutator L is provided for this purpose and activates the electron stream of the tube 17 only during intervals designating the desired ranges while inhibiting the formation of all other images which otherwise would be formed during the remainder of the successive cycles. As shown in Fig. 1, the color commutating means L comprises a switch mechanism driven by a low speed motor 86. The switch mechanism is diagrammatically shown as a plurality of insulating drums 87, 88 and 89 mounted on shaft 91 of the motor 86. The color disc 82 likewise is fixed on the shaft 91 so that its motion is synchronized with the rotation of the color commutator L. Each of the drums 87, 88 and 89 is provided with a conductive segment 92 connected with the respective electrodes 71, 72, 73 through a contactor 94 and filter-compensating resistor 93. The respective segments are disposed relative to one another in such a position that the circuit may be completed through contactors 94 whenever the corresponding color filters completely cover the screen S. The arc subtended by each sector 92 is smaller than the arc substended by the color filters so that the commutator L is non-conductive whenever each color filter extends only part-way across the face of the screen S. The resistors 93 are adjusted to compensate for the different transmission factors for the respective filters 83, 84, 85, it being known that red filters ordinarily transmit appreciably more light than green filters and many times more light than blue filters. The signals passing from the electrodes 71, 72, 73 through conductive segments 92 are conducted to an amplifier 90 where the signals are amplified a suitable degree to key the tube 17.

It will be noticed that the electrodes 71, 72, 73 have parallel sloping adjoining sides so that vertical deflection of the trace T may cause the stream to impinge on two adjoining electrodes. Accordingly, the peaks 81 are adapted to form colored images for each of the electrodes impinged upon, and since color disc 92 normally rotates at least a small number of times per second, the combined colors formed by the respective filters are blended in the eyes of the observer to form the secondary colors, as indicated by the legends in Fig. 2.

As an example of operation, it will be assumed that successive radio frequency pulses are projected as a beam by the radiator R so as to irradiate successive portions of a distant terrain, and that during each cycle originating with a transmitted pulse, reflected energy will produce peaks 81 spaced across the target of the range commutator tube K at predetermined distances from the datum point so as to designate distinct ranges of distance. Whenever the red filter 83 is cooperatively associated with the screen S, only peaks formed on electrode 71 are useful for keying the tube 17 since the only complete path to the amplifier 94 then extends from electrode 71.

Accordingly, all signals received from close objects will form peaks 81 lying on the electrode 71, and the tube 17 is keyed by the resulting signal from the amplifier 90 to produce a bright red-appearing image at a point on the screen S determined by the instantaneous values of the voltages 45', 45". Since this point moves over the screen in synchronism with the irradiated spot over the scanned area, the complete image formed on the screen comprises a visual reproduction of the irradiated area, somewhat as shown in Fig. 3, with distances characterized in color. If the peaks 81 are formed on both of two adjoining electrodes, electrodes 71 and 72 for examples, the tube 17 is operated during the intervals that either the red or the green filters are in cooperative relation, thereby to cause a blending of these colors to the observer. If the signal formed by the peak 81 lies preponderantly on the electrode 71 and only to a minor degree on the electrode 72, the image formed will appear orange; if the peak lies substantially equally on both segments, the image will appear more nearly yellow. In a corresponding manner signals received at successively later intervals following the transmission of each pulse will form peaks lying on either or both of the electrodes 72, 73, which signals will cooperate with the filters 84 and 85 to produce either green or blue appearing images.

Fig. 3 discloses a typical colored representation of th image I' formed on the screen S of the tube 17. An adjustable grid of parallel lines 139 may be formed adjacent to the screen S for determining drift angles, and an index 96 comprising cross hairs and/or an aircraft outline may be formed in the center of the screen to indicate to the pilot the relation of scanned objects to the path of flight. The view formed on the screen S designates the terrain beneath an aircraft, with the various portions thereof characterized in a color corresponding to the distance of the irradiated portions from the apparatus. Although the apparatus as presently disclosed is capable of forming only one group of colored representations at a time, the separately colored representations are formed in such rapid succession that they appear to merge so as to form a complete reproduction, the various portions of which may be portrayed in different colors.

When the device is used to scan the terrain beneath an aircraft, the radiator R directs a beam B downwardly and forwardly of the aircraft in the general manner indicated in Fig. 5 so that the beam may occupy the positions 1, 2, 3, and 4 in any desired order. The beam B, when in position 1, illustrates the general direction of travel of the electromagnetic energy when the beam or pattern is directed substantially vertically downward. It is, of course, desirable that objects having the least clearance between them and the plane be designated by a color close to one end of the color range, preferably red, while objects having the greatest clearance be designated by a color at the opposite end of the color range, e. g., blue violet. Although the present color range employs colors arranged in the general order in which they occur in the spectrum, it is obvious that any range and any order of colors may be used. Hence, a representation formed of the terrain including an irregularity or hill Y as shown, will be colored red at the portion corresponding to the summit, and blue, or violet for the portion corresponding to the base.

It will be apparent from Fig. 5 that since the irregularity Y in the terrain produces a representation extending over the full color range, that such an irregularity Y will not be properly characterized chromatically if the altitude of the aircraft F should change. Accordingly provision is made to correlate the color range with any desired distance range whereby a given color may be made to designate the nearest object at any distance from the point of observation. Furthermore, it will be apparent from Fig. 5 that should the irregularity Y be higher from the ground level than is shown, the range of colors must be extended in order to accommodate the increase in the range of distance between the nearest and remotest points. Both of these functions are performed by the color controller C.

The controller C comprises an amplifier provided with a gain control knob 97 adapted to regulate the degree of amplification which the horizontal sweep signals are given. Accordingly the horizontal displacement of the trace T for a given time interval may be regulated. Since the color range imparted is determined by the distance that the trace T is swept from the datum position along the electrodes of the range commutator K, the controller knob 97 provides correlation between a given range of colors and the distance interval corresponding to the full color range.

Likewise the controller C is provided with a bias control knob 98 adapted to provide a variable direct current bias for the sweep signals applied to the horizontal deflection plates 78, which bias control functions in the manner of the conventional centering adjustment of the ordinary cathode ray oscilloscope. Turning the knob 98, by varying the bias on the plates 78, locates the datum point in such a way that the nearest reflecting object forms a peak 81 in a proper location on the electrodes of the range commutator tube, preferably at the left of the first electrode 71, as shown in Fig. 2.

The operation of the amplifier and bias controls is more readily understood by referring to Figs. 5 and 9. If the beam B is moved forwardly to the positions 3 and 4 of Fig. 5, the distance-color relationships would require readjustment in order to provide proper identification of an irregularity Y' in the irradiated terrain. Not only would the color range require shifting so as to start at a greater distance than was necessary with the irregularity Y, but it would also require effective spreading in order for it to extend over a great differential of distance between the nearest and farthest objects. Fig. 9A, illustrates a maladjusted system wherein the distance range must be scaled down to the color range, (or the color range scaled up to the distance range) and wherein the datum point must be shifted leftward to locate the peaks properly on the range commutator electrodes. In Fig. 9B, the bias control knob 98 has been regulated to shift the datum point 99 so that the peak 81 designating the nearest object falls at the left end of segment 71. Under these circumstances, however, the peak 81 designating the most remote object does not fall on an electrode and hence will not be reproduced on the screen S. This condition can be corrected by adjusting the gain control knob 97 until all peaks 81 lie along the electrodes 71, 72 and 73 as shown in Fig. 9C. During the last operation some readjustment of the bias control knob 98 may be necessary to keep the first peak properly located on the electrode 71.

As will be apparent from Fig. 5 the image I' formed on the screen S cooperates with the color disc to provide a representation colored according to the slant range or absolute distance between the observing apparatus and the irradiated objects. This may be undesirable when the system is applied to relief mapping, since it may then be desirable to indicate irradiated objects in colors corresponding to the absolute altitude of the objects as measured vertically downward from a horizontal line of flight. For example, while the beam B is in the positions 1 or 2 in scanning objects substantially directly beneath the aircraft, the slant range of the objects correspond roughly with the absolute altitude determinations and the distances will be represented quite faithfully as altitude measurements. When the beam shifts forwardly to scan the terrain forwardly of the aircraft, considerable error is introduced by the difference between the slant range and the absolute altitude readings. The slant range, however, may be converted to altitude readings as a function of the depression angles a or a' formed between the beam axis and the horizontal. Thus when the beam is in position 3 of Fig. 5 the absolute altitude of the base of the irregularity Y' may be determined as the product of the slant range or absolute distance to the base, and the sine of the angle a, or as the cosine of the complementary scanning angle, measured from the perpendicular. Likewise when the beam is in position 4, the altitude of the top of the irregularity Y' or vertical component of the slant range may be determined as the product of the slant range and the sine of the angle a'.

Figure 6:
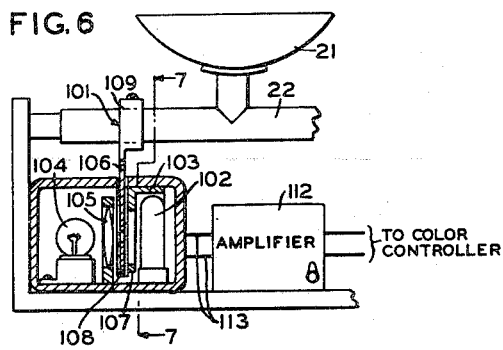
Fig. 6 is a detail view partly in section of the compensator, which corrects for errors introduced by the scanning angle.
Figure 7:
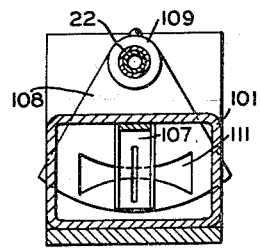
Fig. 7 is a sectional view taken on the line 7—7 of Fig. 6.

Corrections for the angular effects may be obtained automatically by employing a compensator 101 operable in conjunction with the nodding motion of the reflector 21, and being operative on the color controller C to vary the amplification as a function of the depression angle. Various devices may be employed for this purpose, typical of which is the photocell arrangement disclosed in Figs. 6 and 7. A photocell 102 mounted within a substantially light-tight container 103 is excited in any convenient manner as a function of the degree of nod of the antenna system. As shown in Figs. 6 and 7 such an arrangement may comprise a light source 104 and a collimating lens 105 adapted to project light through aperture means 106 onto the sensitive surface of the photocell 102. The aperture means comprises a vertically slotted member 107 and a transversely slotted member 108 having a slot 111 of varying height. The effective light opening is constituted by the overlapping slots in members 107 and 108. The member 108 is mounted to pivot with the supporting member 22, as by means of a clamping collar 109. The opening or slot in the member 108 cooperates with the opening in slotted member 107 to provide light, the intensity of which varies as a function of the nod angle. The edge of the slot 111 curves so that the height of the slot varies with the nod or depression angle to produce a photocell output that increases as a sine function of the depression angle. The photocell output terminals connect with a linear amplifier 112 having output terminals 113 which extend to the color controller C. The connections to the controller C are made similar to automatic volume control connections, whereby the higher the amplitude of the photocell output the lower the gain in the amplifier of the controller C.

Fig. 10 illustrates a simple alternative arrangement for automatically compensating the range signals for the angular deviation of the radiating system from the normal or perpendicular position. Such an arrangement comprises a simple automatic gain control comprising a resistor 114 consisting of a strip of insulating material the width of which varies sinusoidally from a minimum width at the center to a maximum width at both ends. A slider 115 may connect with the supporting member 22 for oscillation therewith, whereby the slider 115 is moved alternately to the right and left from the central position. The slider 115 connects with the grid of an amplifier tube 116 forming a part of the controller C. Opposite ends of the resistor 114 are grounded, and the sweep circuit connection is made to a center tap 117. The slider 115 taps off a portion of the full voltage applied between the center tap 117 and ground, which portion varies as a sinusoidal function of the depression angle by virtue of the shape of the resistor 114. Accordingly, the effect produced is similar to that produced with the arrangement of Figs. 6 and 7. In both instances the change in the gain of the controller C automatically shifts the position of the peaks 81 from that shown in Fig. 9A to that shown in Fig. 9C, preliminary corrections having been made manually to compress the distance between the first and last peaks 81 so that they fit on the range commutator electrodes. Some space is allowed over at each end of the range commutator electrodes to accommodate changing conditions. Thus, if the absolute altitude and/or the range of distances between the nearest and most remote objects is expected to vary within 10 or 15%, corresponding allowance is made in locating the peaks 81 on the range commutator to permit a slight shift in the peaks 81 without having the extreme peaks move off the end electrodes.

Although the apparatus thus far described provides a map in simulated relief when the apparatus is applied to terrain scanning, the pilot of the aircraft may desire to know the absolute altitude of each of the portions designated on the screen S. For this purpose use is made of the distance meter D, shown in Figs. 1 and 4. The meter D comprises a cathode ray tube 119 having horizontal deflection elements 121 and vertical deflection elements 122 controlled by the output of the two-phase oscillator 11. The output connections 123 from the oscillator 11 connect with the respective deflection elements of the cathode ray tube 119 through an amplifier 124 having gain control knobs for each phase, whereby the output may be adjusted to produce a circular sweep about the periphery of the screen 118 of tube 119. Since the oscillator 11 controls the pulse generator 12, the circular sweep cycle of the meter D is coordinated with the generation of pulses. Specifically the phase relationships are adjusted until the circular sweep occupies a 12 o'clock position on the screen 118 at the instant that a pulse is transmitted. A scale of distance units 126, extends about the periphery of the screen 118 and denotes the distances of objects reflecting energy to the receiver. By keying the tube 119 in response to reflected energy, a circular-segmental trace 125 composed of individual closely spaced spots may be made to appear on the screen at positions along the scale 126 corresponding to the distance to the respective reflecting objects. Although an image may be obtained in a single color by keying the tube with the received signals from the receiver 42, as by closing switches 130 to short circuit the color commutator K thereby to indicate the full-range of signals received on both screens S and 118, it is preferred to color the portions of the trace 125 according to the distance of the individual objects producing reflections, in the general manner employed to color the image I'. In Fig. 2 reference was made to seven received pulses disposed along the commutators to illustrate the formation of the respective colors, but it is manifest that in the case of the ordinary irregular terrain a considerably larger number of closely spaced pulses will be received so that a substantially continuous band of color will be formed. The trace 125 in the ordinary case accordingly will resemble a spectrum, somewhat as shown in Fig. 4, with the color red designating the nearest objects and color blue designating the most remote objects.

The trace 125 may be selectively colored with a color commutating arrangement L' substantially identical with the commutator L previously described, except that the respective conducting segments are angularly displaced about the axis of rotation from those of the commutator L by an amount corresponding to the angular displacement of adjoining transparent sectors of color disc I. The commutator L' comprises insulating drums 127, 128, and 129 provided with conductive segments 131. The drums rotate with shaft 91 and accordingly are synchronized with the motion of the color disc 82. Each of the drums is provided with a contactor 132 which completes the circuit from each segment through a resistor 133 to the respective electrodes 71, 72, and 73, and wiper 134 makes continual contact with the shaft 91 and permits the energy to be conducted to an amplifier 135. In order to provide true altimetric indications of distance the output of amplifier tube 135 is conducted to the control grid of tube 119 only when the radiating system projects vertically downward. A switch 136 may be provided for this purpose, which switch is connected to the shaft 58 so as to nod with the antenna system. The switch 136 is provided with a contact 137 which engages the switch blade to close the circuit only at the instant that the beam projects downwardly. The altitude meter 118 accordingly indicates in color the range of distances between the nearest and farthest object directly beneath the plane. A second switch 138 may be provided in shunt across switch 136 to provide a continuous indication on meter D in color of the slant range of all objects irradiated by the system. The meter D will not then however indicate altitude strictly, and the color scale does not accurately depict altitude for all portions of the image I' on screen S.

To overcome this disadvantage a tuner 140 may be provided, controlled by the compensator C to change the frequency of oscillator 11 as the antenna 21 nods, so as to regulate the angular velocity and position of the visible trace on screen 118 as a sine function of the depression angle. The tuner comprises a motive device responsive to the energy in wires 113 passing through switch 140', and controlling a shaft 150 operative on the frequency controlling elements of oscillator 11.

The screen S may cooperate with a grid 139 of parallel lines which may be formed on the glass cover 141 of the terrain-viewing instrument. As shown in Fig. 8, the glass cover may be mounted in a ring 142 having a flange 143 supported in one or more rollers 144. The ring 142 is provided with gear teeth 145 for cooperation with a manually operable pinion 146 controlled by a knob 147 projecting from the instrument panel. Accordingly, the cover 141 may be rotated and the grid 139 oriented relative to the stationary reference 96, e. g. on the screen S, and accordingly permits the pilot to observe when the reproduced terrain appears to move along the grid lines. By comparing the angular position of the grid with a circular reference scale 148 the drift angle may be determined directly. The scale 148 may be provided with gear teeth 153 about its outer periphery for rotation about its axis, by means of a pinion 152, controlled by a self-synchronous motor 154, responsive to the azimuthal heading of the aircraft, through the usual gyroscopic or other direction indicator.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for determining the altitude of an aircraft relative to underlying terrain, comprising means for directively projecting an electromagnetic beam of radiant energy downwardly toward said terrain from said aircraft, means responsive to electromagnetic energy reflected back to said aircraft from portions of said terrain for forming visual reproductions designating said portions, means for angularly disposing said beam relative to the vertical position, and means for quantitatively chromatically characterizing said visual reproductions as a function of the vertical component of the line from said aircraft to said respective portions.

2. Apparatus for determining the altitude of an aircraft relative to underlying terrain, comprising means for directively projecting a beam of radiant energy downwardly toward said terrain from said aircraft, means responsive to electromagnetic energy reflected back to said aircraft from portions of said terrain for forming visual reproductions designating said portions, oscillographic means for presenting said visual reproductions as a map of said portions, and means for quantitatively characterizing said visual reproductions as a function of the vertical component of the line extending from said aircraft to said portions.

3. In altimetric apparatus for scannnig a terrain and forming a chromatically characterized representation thereof indicative of the distance to respective portions of said scanned terrain from said apparatus, the combination comprising a scanner, means for tilting said scanner through scanning angles formed between the instantaneous scanning position of said scanner and the perpendicular position thereof, and means quantitatively chromatically characterizing said representation in accordance with the cosine of the angle so formed.

4. Apparatus for representing a terrain in relief, comprising means for scanning successively adjoining portions of said terrain from a point remote from said terrain, means for determining the bearing angle of said respective portions relative to a reference line extending from said point toward said terrain, means for determining the absolute distance to said respective portions, means for forming images of said portions properly oriented according to their respective depression angles, and means chromatically characterizing the appearance of said images according to the product of the absolute distance of the respective portions and the sine of the depression angle.

5. In apparatus for producing a representation in relief of a distant terrain, the combination comprising means for receiving reflections of electromagnetic energy from successively-adjoining portions of said terrain, means for forming visual representations thereof in response to said reflections, means for selectively positioning said representations according to the directions of said portions of said terrain, means for chromatically characterizing the appearance of said representations by a range of colors, as a function of the distance to said respective portions, and means for varying the relation between a given distance and the range of colors in said characterizing means.

6. Apparatus for representing distant objects in simulated relief, comprising means for electromagnetically irradiating said objects, means forming representations of said objects in accordance with electromagnetic energy reflected from said objects, means for selectively positioning said representations according to the directions of said objects, means quantitatively characterizing said representations in color as a function of object distance, and means for adjusting substantially the full range of colors to the indicated distance between the nearest and farthest objects.

7. Apparatus for representing distant objects in simulated relief, comprising means for irradiating said objects with electromagnetic energy, means for measuring the travel time for said energy to travel to and from said objects, oscilloscopic means for forming visual reproductions of said objects in response to reflections of energy from said objects, means for distinguishingly applying a range of colors to said reproductions, and regulating means for varying the color to be applied to said reproductions designating an object at a given distance.

8. Apparatus for representing distant objects in simulated relief, comprising means for irradiating said objects with electromagnetic energy, means for measuring the travel time for said energy to travel to and from said objects, oscilloscopic means for forming visual reproductions of said objects in response to reflections of energy from said objects, means for applying a range of colors to said visual reproductions, and regulating means for adjusting the variation in color applied to said visual reproductions designating objects separated by a given increment of distance from said apparatus.

9. Apparatus for producing colored representations comprising a plurality of oscilloscopes having mutually adjoining screens on which electron beam reproductions may be formed, means for positioning a plurality of differently colored filters adjacent to said screens in sequence, and means cooperating with said filters to render each of said oscilloscopes operable when a predetermined one of said filters is in a predetermined adjoining operative position.

10. Coloring apparatus, comprising a rotatable disc having sectors of transparent differently-colored material, a plurality of oscilloscope tubes having indication-forming screens adjacent to respective sectors, and a plurality of tube-control commutators for connecting said sectors for each of said tubes, and means for operating said commutators in synchronism with said disc, whereby said commutators render the respective tubes operable to form an indication when a predetermined colored sector adjoins the respective screens.

11. Apparatus as claimed in claim 10 including a switching device adapted to conduct a tube-energizing signal alternately to a predetermined one of said commutators.

12. Coloring apparatus, comprising a pair of range indicating oscilloscopes having fluorescent screens, a rotatable vari-colored segmented transparent filter disc positioned adjacent to both said screens, and means synchronizing the operation of said oscilloscopes with said filter disc, whereby each of said respective scopes is operable when a predetermined segment of said filter adjoins its respective screen.

13. Apparatus for chromatically characterizing reproductions formed on the fluorescent screens of cathode ray tubes, comprising a rotatable vari-colored segmented transparent disc, a duality of cathode ray tubes having their screens positioned adjacent to said disc and readily visible therethrough, and commutating means cooperating with said tubes intermittently rendering them inoperable when other than a predetermined colored sector is positioned adjacent to said respective screens.

14. Viewing apparatus comprising means for forming a map-like substantially scalar representation of portions of a distant terrain, means cooperating with said first named means to chromatically characterize the represented portions as a function of the distances to the corresponding portions of said terrain, and a scale correlated with said last named means to indicate the true distances of the portions so chromatically characterized.

15. Navigation apparatus comprising means for forming a representation of portions of a terrain under observation, said representation forming means including means for positioning the portion representations in a map-like array corresponding substantially scalarly to a projection of a view of the terrain, means quantitatively chromatically cooperating with said first named means characterizing the respective portions of said representation as a function of the distance from said apparatus to corresponding portions of said terrain, and a scale correlated with said last named means to indicate the distance of the portions so characterized.

16. Viewing apparatus comprising means for forming a colored representation of portions of a distant terrain, means cooperating with said first named means for chromatically characterizing the respective portions of said representation quantitatively as a function of the distance from said apparatus to corresponding portions of said terrain, means for associating a particular color with a particular distance, and a variable scale correlated with said last named means for giving distance indications representative of such colors.

17. Viewing apparatus comprising means forming a representation of portions of a distant terrain, colored disc means cooperating with said first named means for chromatically characterizing the respective portions of said representation as a function of the distance from said apparatus to said corresponding portions of said terrain, means for correlating individual colors of said colored disc with predetermined colors representative of the distances ranging between the nearest and farthest portions of said terrain and a device cooperatively associated with said last named means for defining such colors in quantitative terms of distance.

18. Viewing apparatus, comprising means for irradiating successive portions of a distant terrain with electromagnetic energy, a screen, means responsive to reflections of energy from said portions for producing visual representations of said portions properly oriented on said screen, further means for determining a function of the distance to said respective portions, means cooperating with said latter means for chromatically characterizing the portions of said representations according to said determined distance function, and a distance indicator correlated with said last named means and having a scale designating said distance functions, said indicator further having colors adjoining said scale and associated therewith to indicate the distance to the portions of said terrain, according to the chromatic characterization of said representations.

19. Viewing apparatus, comprising means for irradiating successive portions of a distant terrain with electromagnetic energy, a screen, means responsive to reflections of energy from said portions for producing visual representations of said portions properly oriented on said screen, further means for determining a function of the distance to said respective portions, a distance indicator correlated with said last named means having a scale thereon designating said distance functions, and means cooperating with said scale to form a colored linear zone in accordance with said distance functions.

20. Apparatus as claimed in claim 19 including means for associating with said representation and portion of said zone corresponding to the nearest object, a color adjacent to one end of the full range of available colors.

21. Viewing apparatus, comprising means for irradiating successive portions of a distant terrain with electromagnetic energy, a screen, means responsive to reflections of energy from said portions for producing visual representations representing said portions properly oriented on said screen, further means for determining a function of the distance to said respective portions, means cooperating with said latter means for chromatically characterizing the portions of said terrain according to their determined distance function, a distance indicator correlated with said latter means and having a scale thereon designating said distance functions, and means for forming in cooperative relation with said scale a linear zone colored according to said distance functions, said last named means including regulating means for varying on said scale the length of said colored linear zone until said zone extends substantially between the scale indications denoting the nearest and farthest objects.

22. Viewing apparatus, comprising means for irradiating successive portions of a distant terrain with electromagnetic energy, a screen, means responsive to reflections of energy from said portions of said distant terrain for producing visual representations thereof properly oriented on said screen, further means for determining a function of the distance to said respective irradiated portions, an indicator associated therewith having linear units designating distance, means cooperating with said responsive means for projecting visual representations adjacent to said scale at points corresponding to the distance of the reflecting portions of said terrain, and color means comprising a plurality of transparent differently-colored filters cooperative in succession with said screen and with the representations adjacent to said scale to similarly impart an appearance of color to both groups of representations as a function of the distance to the corresponding portions of said terrain.

23. In a system utilizing the principle of radio electromagnetic energy reflections to form reproductions of remote objects on cathode ray tubes having fluorescent screens, range indicating apparatus for chromatically characterizing said reproductions comprising a plurality of individual cathode ray tubes, a plurality of colored filters revolving in front of said screens, and means for properly positioning said filters before each of said individual screens of said cathode ray tubes, whereby reproductions of distant objects formed on said screens may be chromatically characterized.

24. Altimetric apparatus comprising means for scanning a terrain and irradiating same with a beam of collimated electromagnetic energy, means continuously angularly directing said scanner, means receiving reflections from said irradiated terrain and means for translating these reflections into chromatically characterized representations indicative of the distance of said irradiated terrain from said scanner, said chromatic characterization of said representation being dependent upon the cosine of the angle between the vertical position of said scanner and the scanner position at which said terrain is irradiated.

25. The method of electromagnetically irradiating successive portions of a terrain from a remote point to form a chromatically characterized representation thereof in relief in accordance with radio electromagnetic energy reflected from said portions of said terrain, comprising the steps of irradiating said terrain, establishing a bearing angle and a depression angle between said irradiated terrain and said point, and chromatically characterizing the distance between said irradiated terrain and said point as a function of both of said angles.

26. The method of electromagnetically irradiating successive portions of a terrain from a remote irradiator to form a chromatically characterized representation of said terrain in relief in accordance with radio electromagnetic energy reflected from said portions of said terrain, comprising the steps of irradiating said portions of said terrain, orienting said irradiator with respect to said portions of said terrain, determining the bearing angle and the depression angle between said irradiator and said portions of said terrain, and determining the distance between said portions of said terrain and said irradiator as a function of both of said angles.

27. A method for indicating distance to a succession of remote objects from a predetermined initial point utilizing the principle of radio electromagnetic energy reflection, comprising the steps of directionally irradiating said remote succession of objects, receiving reflections therefrom, converting said reflections to scalarly positioned representations corresponding to a projected view of said remote objects, said representations being positioned according to the represented irradiation directions, and chromatically varying said representations of said remote objects in accordance with the distance to said remote objects and a prescribed color distance correlation.

28. A distance indicating device utilizing the principle of electromagnetic radio energy reflections for determining the distance to a succession of remote objects from a predetermined point, comprising means irradiating said object, means receiving reflections from said object, at least one of said last two means comprising directionally selective means and means for recurrently varying the direction thereof, means converting said reflections into representations definitive of the distance and direction of said remote object from said point, and means cooperating with said converting means to chromatically characterize said representations in accordance with a prescribed color distance arrangement.

29. A method of electrically pictorializing a distant terrain in accordance with the principle of electromagnetically irradiating said terrain from an irradiating source, comprising the steps of receiving reflections from said distant terrain, converting said reflections into pictorial representations indicative of said distant terrain, and denoting the near and far range limits of said distant terrain from said irradiator in accordance with predetermined different color tones having prescribed distance connotations, portions of the pictorial representations corresponding to terrain regions at lesser distances being colored in contrast to the coloring of portions corresponding to regions at greater distances.

WALDEMAR A. AYRES.

REFERENCES CITED

The following references are of record in the file of this patent:

UNITED STATES PATENTS

| Number | Name | Date |
| --- | --- | --- |
| 1,913,148 | Alexanderson | June 6, 1933 |
| 2,013,594 | Zworykin | Sept. 3, 1935 |
| 2,098,231 | Du Mont | Nov. 9, 1937 |
| 2,143,035 | Smith | Jan. 10, 1939 |
| 2,189,549 | Hershberger | Feb. 6, 1940 |
| 2,225,046 | Hunter | Dec. 17, 1940 |
| 2,227,598 | Lyman, et al. | Jan. 7, 1941 |
| 2,231,929 | Lyman | Feb. 18, 1941 |
| 2,312,792 | Bamford | Mar. 2, 1943 |
| 2,395,966 | Goldberg | Mar. 5, 1946 |
| 2,399,671 | Gage | May 7, 1946 |
| 2,403,527 | Hershberger | July 9, 1946 |
| 2,408,415 | Donaldson | Oct. 1, 1946 |
| 2,408,848 | Hammond | Oct. 8, 1946 |

FOREIGN PATENTS

| Number | Country | Date |
| --- | --- | --- |
| 108,556 | Australia | Sept. 14, 1939 |